United States Patent
Vrancken et al.

(10) Patent No.: US 9,071,593 B2
(45) Date of Patent: Jun. 30, 2015

(54) SYSTEM AND METHOD FOR ACCESSING PRIVATE DIGITAL CONTENT

(75) Inventors: Bart Vrancken, Leuven (BE); Bart Theeten, Sint-Niklaas (BE)

(73) Assignee: Alcatel Lucent, Boulogne-Billancourt (FR)

( * ) Notice: Subject to any disclaimer, the term of this patent is extended or adjusted under 35 U.S.C. 154(b) by 135 days.

(21) Appl. No.: 13/502,187

(22) PCT Filed: Oct. 15, 2010

(86) PCT No.: PCT/EP2010/065502
§ 371 (c)(1),
(2), (4) Date: Apr. 16, 2012

(87) PCT Pub. No.: WO2011/051110
PCT Pub. Date: May 5, 2011

(65) Prior Publication Data
US 2012/0210448 A1   Aug. 16, 2012

(30) Foreign Application Priority Data
Oct. 26, 2009   (EP) ...................................... 09306010

(51) Int. Cl.
*H04L 29/06* (2006.01)
*G06F 21/31* (2013.01)

(52) U.S. Cl.
CPC ............ *H04L 63/0807* (2013.01); *G06F 21/31* (2013.01); *H04L 63/0853* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 8,549,620 B2 * | 10/2013 | Ueda et al. | 726/17 |
| 2004/0019801 A1 | 1/2004 | Lindholm et al. | |
| 2004/0128546 A1 * | 7/2004 | Blakley et al. | 713/201 |
| 2004/0133908 A1 * | 7/2004 | Smith et al. | 725/31 |
| 2005/0289641 A1 * | 12/2005 | Miura et al. | 726/4 |
| 2010/0100952 A1 * | 4/2010 | Sample et al. | 726/9 |

FOREIGN PATENT DOCUMENTS

EP   1357458   10/2003

OTHER PUBLICATIONS

Goovaerts, Tom et al., "A comparison of two approaches for achieving flexible and adaptive security middleware", MidSec '08 Proceedings of the 2008 workshop on Middleware security, pp. 19-24.*
Vrancken, Bart et al; Using OAuth for Recursive Delegation; draft-vrancken-oauth-redelegation-00.txt; Internet Draft, Internet Engineering Task Force; Sep. 1, 2009; XP015064118.

* cited by examiner

*Primary Examiner* — David Le
(74) *Attorney, Agent, or Firm* — Patti & Malvone Law Group, LLC

(57) ABSTRACT

A system, method and computer program product for providing access to private digital content are disclosed. The private digital content is owned by an owner and installed on a content server and access is provided to a first client which is capable of rendering said digital content. Predetermined information required for gaining authorized access to said content server by said first client is generated by a second client. The predetermined information is transferred from said second client to said first client then used by said first client to get access to said private digital content.

15 Claims, 5 Drawing Sheets

SYSTEM AND METHOD FOR ACCESSING PRIVATE DIGITAL CONTENT

TECHNICAL FIELD

The present invention relates to a system and method for accessing private digital content.

BACKGROUND

There exists an Open authentication (OAuth) protocol (see OAuth Specification 1.0 available at http://oauth.net/license/core/1.0) to handle user credentials between multiple parties on the web. Further, there exist a number of token-based sharing solutions that enable content sharing between web entities similar to the before mentioned OAuth system. For instance, Facebook, Flickr, Google, Smugmug and Photobucket all use tokens for authentication.

PeCMan is a web-tool that organizes a user's content (see http://www.pecman.net/). A schematic view of the PeCMan architecture is depicted in FIG. 1. Users can for example upload URLs in PeCMan, semantically tag the information with free-format tags and later find that information back by querying PeCMan with the same tags. Since multiple URLs can be tagged with the same tags, PeCMan enables a user to organize all objects that are kept on a plethora of storage providers (e.g. web servers, home stores or mail servers) through one logical location akin a "virtual drive".

PeCMan recognizes three kinds of references: public, private non-shared and private shared content. Public content are URLs pointing at publicly available web sources. Accessing such content does not require user credentials, which implies that one can easily share such content with whomever is interested in that content. When public information is shared between users, PeCMan simply sends the requested URLs directly to the requesting or secondary PeCMan client and the secondary PeCMan client retrieves the content through e.g. WebDAV or HTTP.

Private content is typically content that can only be accessed through a secured location, typically a secured website (i.e. storage providers). To access secured storage providers 7, a web client 3 first establishes a secure connection e.g. through SSL/TLS, and then provides the user credentials (typically a user-ID and password) to authenticate the user. After a user is authenticated, a web client 3 can access privately stored content. Typically inside the addressed web server 7 a state is allocated that is associated with the communication channel. This state indicates to the web server 7 that the requesting web client 3 has authenticated itself.

Some devices that can be used to render or play this privately stored content don't have the capability to request users for credentials and to set up a secure session with the media server.

SUMMARY OF THE INVENTION

According to embodiments of the invention there is provided an improved method and system for sharing private content which is convenient for the owner of the private content and yet provides sufficient security.

A token in the context of the present invention is a value generated upon verification of a number of credentials of the requester of the token. This value is typically a string of a number of characters generated at random by a content server.

According to an embodiment of the invention there is provided a method for providing access to private digital content, owned by an owner and installed on a content server, to a first client which is capable of rendering the digital content, comprising
    generating predetermined information by a second client, required for gaining authorised access to the content server by the first client;
    transferring the predetermined information from the second client to the first client;
    using the predetermined information by the first client to get access to the private digital content.

A content server in the context of the present invention typically refers to a secure content server, and can for example be a secure Web-server. Other examples are a local disc with file sharing capabilities, any computer having installed thereon a server program so that the computer functions as a content server, etc.

According to preferred embodiments, the predetermined information is dependent on first client specific information.

According to preferred embodiments, the predetermined information is dependent on second client specific information.

According to preferred embodiments, the method further comprises transferring the first client specific information from the first client device to the second client device. In other embodiments transferring the first client specific information is not necessary as this information may already be available to the the second client.

According to preferred embodiments, the predetermined information comprises information to authenticate the first client to the content server.

According to preferred embodiments, wherein the predetermined information comprises owner specific information.

According to preferred embodiments, generating predetermined information by a second client comprises one or more standard Open Authentication calls.

According to preferred embodiments, generating predetermined information by a second client comprises interacting with a content management server, for instance a PeCMan server.

A content management server in the context of the present invention has to be interpreted in the broad sense referring to any server capable of managing for example public and/or private shared and/or private unshared digital content of a plurality of users, such as pictures, video's, etc. The content itself can be stored locally or at a remote location. Examples of such a content management server are simple content management servers, such as used by content providers like Flickr, YouTube, etc, any type of content aggregators such as PeCMan, SecondBrain, iGoogle, any types of owner's proxies, proxies with selective proxy functionality, etc.

A preferred embodiment of such a content management server will be adapted to allow tagging of the content.

According to a second aspect of the present invention, a system is disclosed for accessing private digital content owned by an owner, comprising a content server comprising the private digital content; a first client which is capable of rendering the digital content; a second client owning the digital private content stored on the content server; wherein the second client is adapted for generating predetermined information required for gaining authorised access to the content server by the first client; wherein the second client is adapted for transferring the predetermined information to the first client; and wherein the first client is adapted for using receiving the predetermined information from the second client to get access to the private digital content.

Also a computer program product is disclosed comprising computer-executable instructions for performing a method according to any of the methods of the first aspect, when the program is run on a computer.

BRIEF DESCRIPTION OF DRAWINGS

The accompanying drawings are used to illustrate presently preferred non-limiting example embodiments of the present invention. The above and other advantages features and objects of the invention will become more apparent and the invention will be better understood from the following detailed description when read in conjunction with accompanying drawings in which.

DETAILED DESCRIPTION

The invention will be illustrated below referring to a PErsonal Content MANagement (PeCMan) server as the content management server, but the skilled person will understand that the invention is applicable to any type of content management server (including owner's proxies) as defined above.

According to a first type of prior art, to support private non-shared and shared content, PeCMan typically stores the user credentials with the URL that is being pointed at. If private content is being addressed, a secondary PeCMan client 3 sets up a communication channel to PeCMan 1, which then establishes a connection to the storage provider 7 on behalf of the secondary PeCMan client, i.e. the PeCMan server 4 acts as proxy for the secondary PeCMan client 3. This proxy maintains the secure connection to the web server 7 and is also the one that provides the user credentials to the storage provider 7. PeCMan does this for both shared and non-shared private content references.

Figure 3:
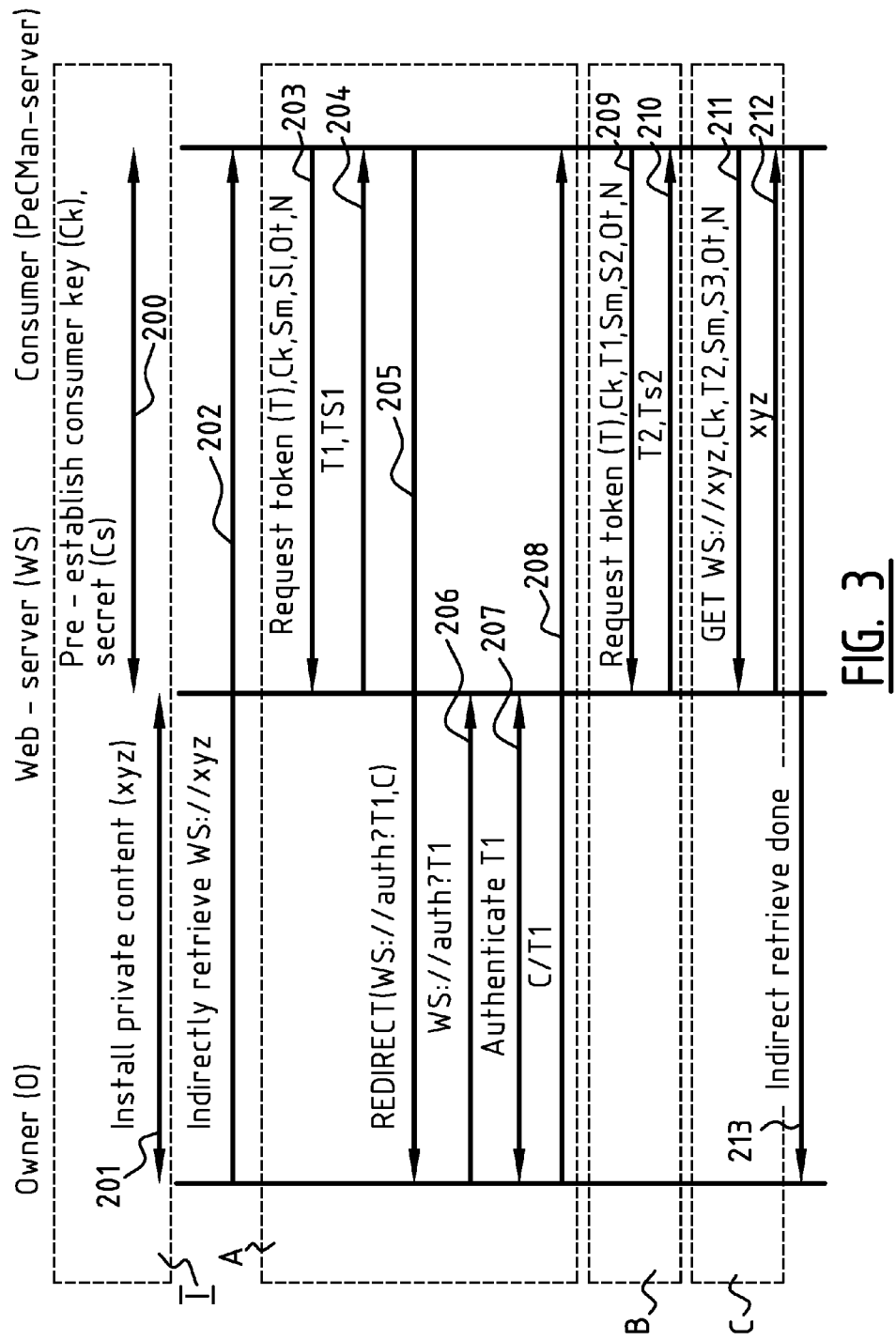
FIG. 3 illustrates a call flow according to a state of the art method for delegating a PeCMan server.

According to a second type of prior art, OAuth is used to share private data between a private content provider and a third entity, so that the third entity can access the user's private data without having to know the user credentials, through a token-based authentication mechanism which is illustrated in FIG. 3.

In a first stage of the second type of prior art, a delegate token is obtained by a content management server, such as a PeCMan server, as illustrated by the call flow of FIG. 3, showing an exemplary delegation procedure for authorizing a PeCMan server to speak for a content owner 0. The PeCMan server will function as a client of a private content server, here a secure Web-server WS. In an initiation phase "I" the PeCMan server establishes a secure connection with the Web-server WS, wherein a consumer key Ck and a secret key Cs is established between them, see arrow 200. Also, the owner O installs private content xyz directly on the Web-server WS, see arrow 201. Typically the owner will log in the secure Web-server using a user name and password, whereupon he can install the private content xyz. Next the owner O informs the PeCMan server that it has installed private content xyz on the protected Web-server, see arrow 202.

Being informed about the installed private content, the PeCMan server will request a token and have this token authenticated by the owner in a stage A of the call flow. First the PeCMan server requests a token from the Web-server WS, see arrow 206. This can be a standard OAuth request call which contains the following parameters: the consumer key Ck (oauth_consumer_key), the signature method Sm (oauth_signature_method), a signature S1 (oauth_signature), a timestamp Ot (oauth_timestamp) and a nonce N (oauth_nonce). The signature S1 can for example be created using Cs. Typically the client will first generate the timestamp and then a Nonce value is generated that is unique for each request. The Web-server WS then generates a token T1 (oauth_token) and a Token secret Ts1 (oauth_token_secret), and sends those to the PeCMan server, see arrow 204. The PeCMan server then sends a redirect message (arrow 205) to the owner for obtaining approval from the owner by directing the owner to the Web-server WS. This can be a standard OAuth request to the Web-server's user authorization URL "WS://auth?", including the token T1 and a call back URL C, which is a URL the Web-server will use to redirect the owner back to PeCMan server. The authorization request is then passed through to the Web-server (arrow 206) and the Web-server will authenticate the token T1, typically verifying the identity of the PeCMan server and asking the owner for consent (arrow 207). For example, a secure connection to the private content provider (Web-server WS) is established, logging in by offering the PeCMan's credentials and associating the token with the secure connection. The PeCMan server is then notified by the owner O that the token T1 has been authorized using the call back URL (arrow 208), e.g. using a standard OAuth call. The PeCMan server then, see stage B, requests a second token using his first token T1 (arrow 209). This can for example be done using a standard OAuth request for exchanging a request token for an access token with the following parameters: the consumer key Ck (oauth_consumer_key), the token obtained previously T1 (oauth_token), the signature method Sm (oauth_signature_method), a signature S2 (oauth_signature), a timestamp Ot (oauth_timestamp) and a nonce N (oauth_nonce). The signature S2 can for example be calculated on the basis of Cs and Ts1. In reply a second token T2 and Token secret Ts2 are granted by the Web-server WS (arrow 210). This second token T2 can function as a delegate token for getting access to the owner's private content (211,212).

This can be done using a standard access request containing for example the following parameters: the consumer key Ck (oauth_consumer_key), the token T2 (oauth_token), the signature method Sm (oauth_signature_method), a signature S3 (oauth_signature), a timestamp Ot (oauth_timestamp) and a nonce N (oauth_nonce). The signature S3 can for example be calculated using Cs and Ts2.

These state of the art solutions do not allow a device/a client to retrieving private content if the device/client does not comprise (e.g. PeCMan) authentication capabilities towards the content server or towards the content management server (e.g. PeCMan server).

In a first type of embodiments according to the present invention, the above described flow or a similar flow can preferably be used, but is modified in that the second client, for instance the DMC, plays the role of the consumer (PeCMan-server), for generating the predetermined information necessary for gaining access to said content server by the first client.

Figure 4:
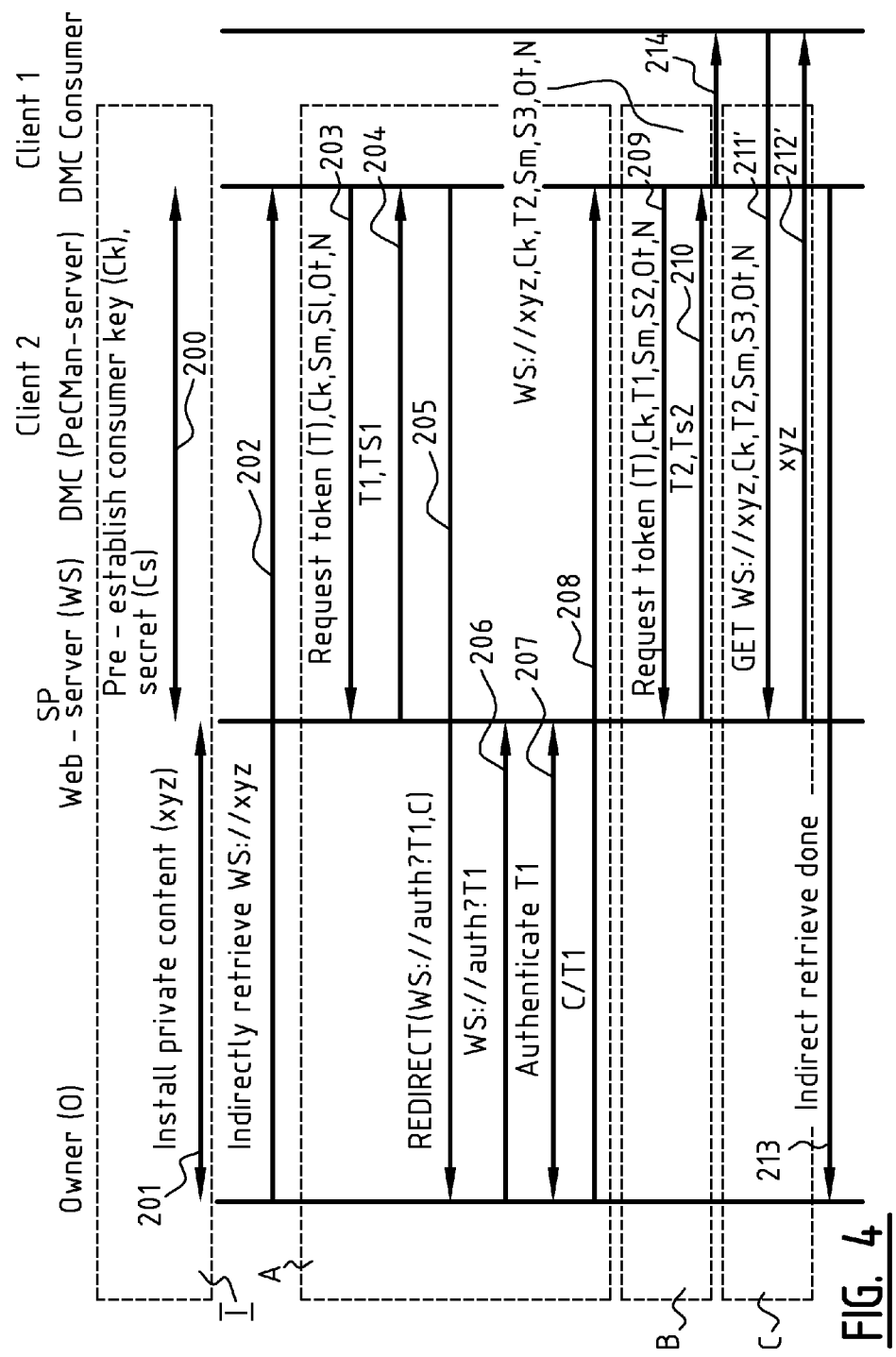
FIGS. 4 and 5 illustrate call flows according to embodiments of methods of the invention for retrieving private content by a client which does not comprise (e.g. PeCMan) authentication capabilities.

This predetermined information is then transferred to the first client device (214), for instance the DMP (or DMR) by means of for instance DLNA, which can then directly access the private content on the content server (211', 212'). This is illustrated in FIGS. 2 and 4.

According to this first type of embodiments, the second client can thus use his own credentials in order to get access to private content, rendered on a non-trusted device, without transferring his credentials itself to such device. But, according to other preferred embodiments of a second type, the second client can also use the credentials from the first client in order to get access to private content, wherein the credentials of the first client
   a) were available to him;
   b) are provided to him.

Figure 1:
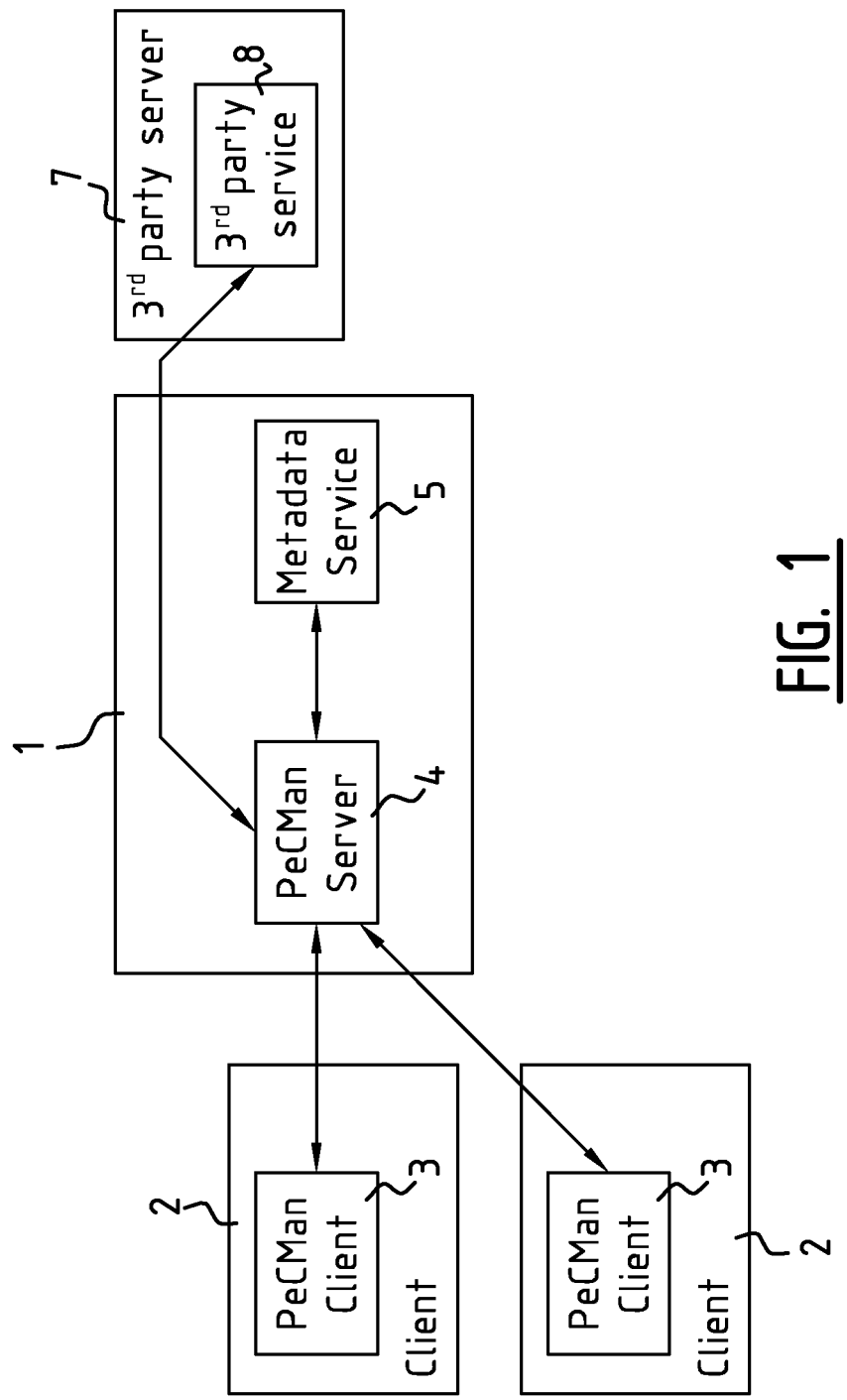
FIG. 1 is a schematic view of the PeCMan architecture.
Figure 2:
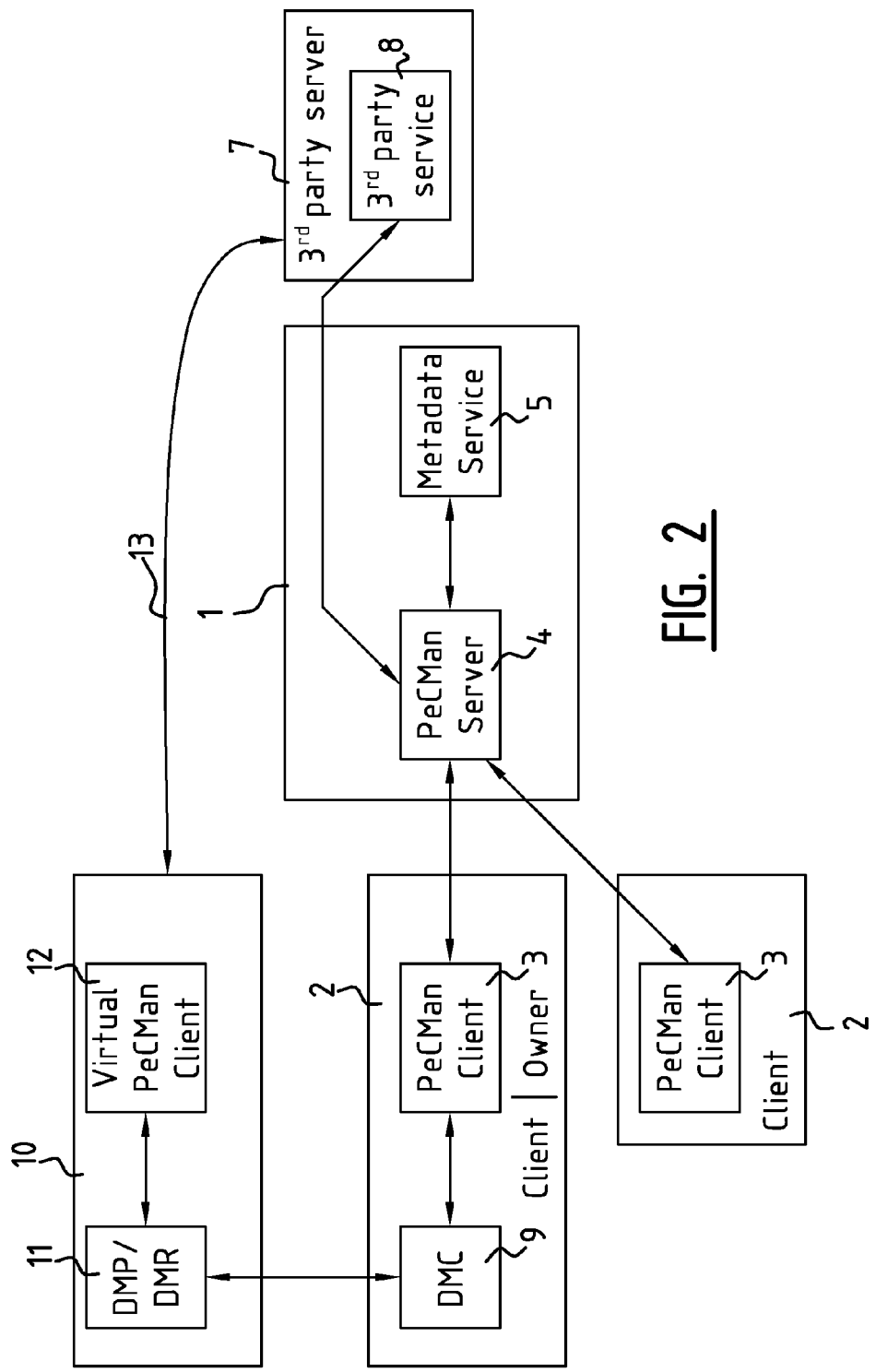
FIG. 2 is a schematic view of the PeCMan architecture which has been extended according to embodiments of the present invention.
Figure 5:
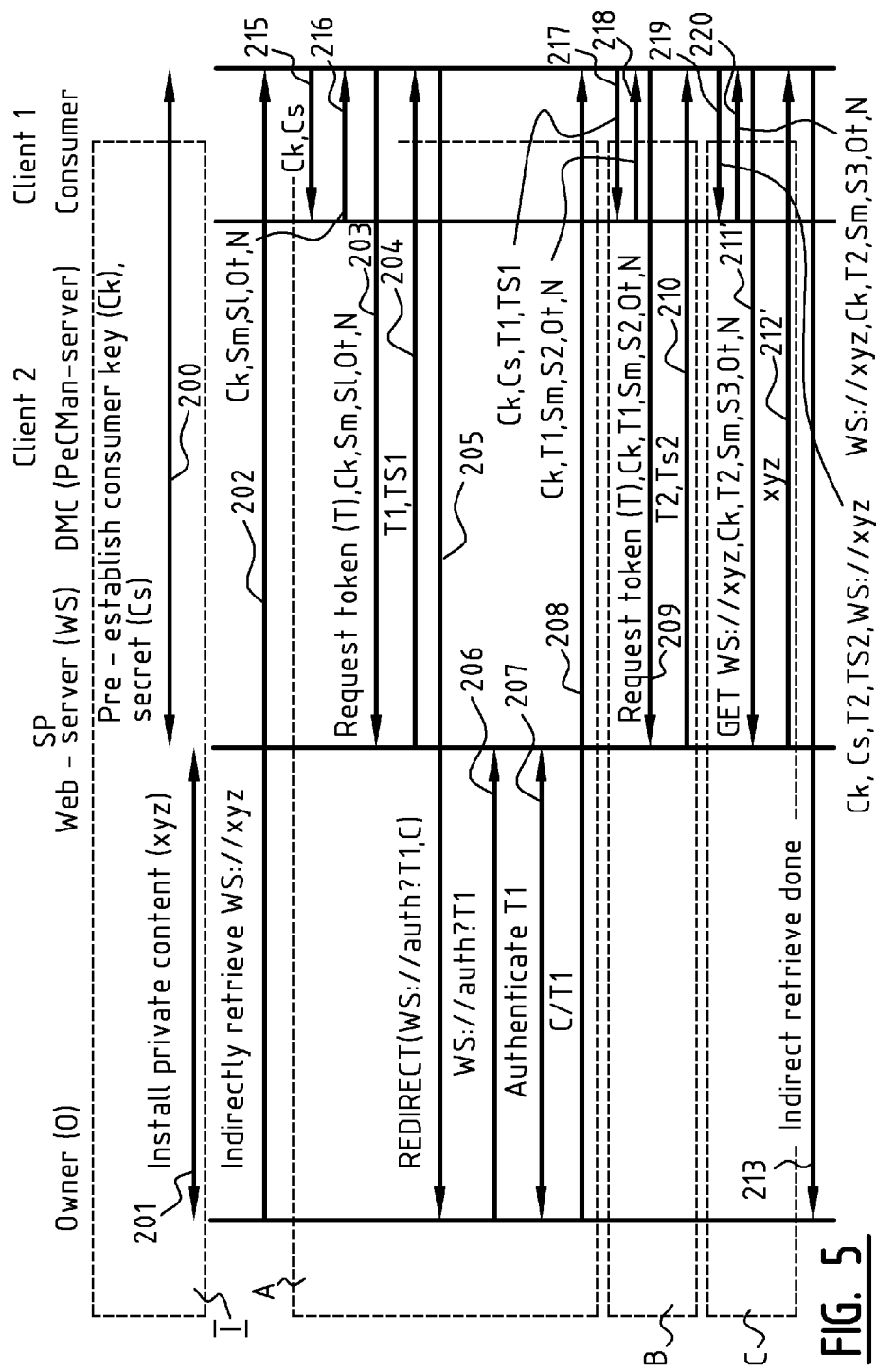

A second type of embodiments of the present invention is illustrated in FIGS. 2 and 5. The first client 10 that wants to render or play the private content is for instance a television device (which can be considered a digital media renderer (DMR) or a digital media player (DMP), terminology which is used in the DLNA specification). The television device is not able to calculate the different authorization (e.g. OAuth) parameters and hands over his credentials to a device which has those capabilities, for instance an iPhone™[2] that comprises functionalities of a digital media controller 9 (DMC, terminology which is used in the DLNA specification). Based on the credentials of the TV, the iPhone™ is able to construct the required authentication information, for instance a valid URL with OAuth-parameters. This information is then transferred to the television device and the television device can get the desired content directly from the service provider 13 via that URL, being a "virtual PeCMan client" 12 in a certain view. The exchange of information between the television device (DMR or DMP) and the iPhone™ preferably based on technology and methods based on the DLNA-specification.

The flow can be similar to the flow of the embodiments of the first type according to the present invention, and can be as follows.

In a first stage of the second type of embodiments, a delegate token is obtained by a digital media renderer, such as a television device, as illustrated by the call flow of FIG. 5, showing an example delegation procedure for authorizing the television device to speak for a content owner 0, getting the private content. The iPhone™ will function as a device able to calculate the authorization parameters. In an initiation phase "I" the television device establishes a secure connection with the Web-server WS, wherein a consumer key Ck and a secret key Cs is established between them, see arrow 200. Also, the owner O installs private content xyz directly on the Web-server WS, see arrow 201. Typically the owner will log in the secure Web-server using a user name and password, whereupon he can install the private content xyz. Next the owner O informs the PeCMan server that it has installed private content xyz on the protected Web-server, see arrow 202.

Being informed about the installed private content, the television device wants to request a token and have this token authenticated by the owner in a stage A of the call flow. First the television device sends his credentials, the consumer key Ck and the consumer Secret Cs to the iPhone™, see arrow 215. Based on this credentials, the iPhone™ can calculate the necessary parameters for an authentication request. This can be a standard OAuth request call which contains the following parameters: the consumer key Ck (oauth_consumer_key), the signature method Sm (oauth_signature_method), a signature S1 (oauth_signature), a timestamp Ot (oauth_timestamp) and a nonce N (oauth_nonce). The signature S1 can for example be created using Cs. Typically the client will first generate the timestamp and then a Nonce value is generated that is unique for each request. The iPhone™ sends these parameters to the television device, see arrow 216. The television device requests a token from the web-server with those parameters, see arrow 203. The Web-server WS then generates a token T1 (oauth_token) and a Token secret Ts1 (oauth_token_secret), and sends those to the television device, see arrow 204. The PeCMan television device then sends a redirect message (arrow 205) to the owner for obtaining approval from the owner by directing the owner to the Web-server WS. This can be a standard OAuth request to the Web-server's user authorization URL "WS://auth?", including the token T1 and a call back URL C, which is a URL the Web-server will use to redirect the owner back to PeCMan server. The authorization request is then passed through to the Web-server (arrow 206) and the Web-server will authenticate the token T1, typically verifying the identity of the PeCMan server and asking the owner for consent (arrow 207). For example, a secure connection to the private content provider (Web-server WS) is established, logging in by offering his private credentials for that web-server and associating the token with the secure connection. The television device is then notified by the owner O that the token T1 has been authorized using the call back URL (arrow 208), e.g. using a standard OAuth call.

The television device sends his credentials, consumer key (Ck), consumer secret (Cs), token (T1) and token secret (TS1) to the iPhone™, see arrow 217. Based on this credentials, the iPhone™ can calculate the necessary parameters for an authentication request. This can for example be done using a standard OAuth request for exchanging a request token for an access token with the following parameters: the consumer key Ck (oauth_consumer_key), the token obtained previously T1 (oauth_token), the signature method Sm (oauth_signature_method), a signature S2 (oauth_signature), a timestamp Ot (oauth_timestamp) and a nonce N (oauth_nonce). The signature S2 can for example be calculated on the basis of Cs and Ts1. The iPhone™ sends these parameters to the television device, see arrow 218. The television device then, see stage B, requests a second token using those parameters (arrow 209). In reply a second token T2 and Token secret Ts2 are granted by the Web-server WS (arrow 210). This second token T2 can function as a delegate token for getting access to the owner's private content, by sending the right credentials to the iPhone™ for calculating the message (219,220,211', 212').

According to further alternative embodiments the second client device can be different from a DMC device, and the communication of predetermined information and exchange of information between the second and the first client device can be based on other mechanisms. For instance, proxy-servers can be used, which keep credentials of devices that cannot calculate the predetermined information (for instance the right URL). The first client device can ask the proxy to calculate the right parameters. The proxy then transfers the resulting URL to the device, enabling the device to access the private content on the content server (for instance the OAuth protected resources).

It is to be noted that the method according to embodiments of the present invention is not limited to first client devices which are not capable themselves of generation the predetermined information for accessing private content on the content server. The first client devices may for instance be mobile phone devices or PDA's which intrinsically comprise these capabilities, but for which, for instance because of security issues, the necessary credentials are not stored on the device. In that case these credentials may be stored on a proxy, and, upon request from the first client device, the proxy may generate the predetermined information required for accessing said content server for the first client, and transfer it to the first client, after which the first client accesses the private content on the content server. These scenario's thus provide security advantages.

A person skilled in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

While the principles of the invention have been set out above in connection with specific embodiments, it is to be clearly understood that this description is merely made by way of example and not as a limitation of the scope of protection which is determined by the appended claims.

The invention claimed is:

1. A method for providing access to private digital content, owned by an owner and installed on a content server, to a digital media player (DMP) which is capable of rendering said digital content but not capable of generating authentication information, comprising the steps of:
    sending DMP specific information from the DMP to a digital media controller (DMC);
    receiving authentication information generated by the DMC from said DMP credentials, said authentication information required for gaining authorized access to private digital content on said content server;
    using said authentication information by said DMP to request a first token from the content server;
    using the first token to request approval for access to the private digital content from the owner;
    sending the first token and the DMP specific information to the DMC for the generation of second authentication information;
    using the second authentication to request a second token from the content server; and
    using the second token to access the private digital content from the content server.

2. A method according to claim 1, wherein said authentication information is dependent on DMC specific information.

3. A method according to claim 1, wherein said authentication information comprises owner specific information.

4. A method according to claim 1, wherein said authentication information is generated by the DMC from said DMP specific information using one or more standard Open Authentication calls.

5. A method according to claim 1, wherein said authentication information is generated by the DMC from said DMP specific information by interacting with a content management server.

6. A computer program product embodied on a non-transitory computer readable medium a digital media player (DMP) which is capable of rendering said digital content but not capable of generating authentication information, said computer program product comprising:
    computer code for transferring DMP specific information from said DMP to a digital media controller (DMC);
    computer code for receiving authentication information generated by said DMC from said DMP specific information, said authentication information required for gaining authorized access to private digital content on a content server by said DMP;
    computer code for using said authentication information by said DMP to request a first token from the content server;
    computer code for using the first token, by the DMP, to get access to the private digital content from the owner;
    computer code for sending the first token and the DMP specific information to the DMC for the generation of second authentication information;
    computer code for using the second authentication to request a second token from the content server; and
    computer code for using the second token to access the private digital content from the content server.

7. The computer program product as recited in claim 6, wherein said authentication information is dependent on DMC specific information.

8. The computer program product as recited in claim 6, wherein said authentication information comprises owner specific information.

9. The computer program product as recited in claim 6, wherein said authentication information is generated by the DMC from said DMP specific information using one or more standard Open Authentication calls.

10. The computer program product as recited in claim 6, wherein said authentication information is generated by the DMC from said DMP specific information by interacting with a content management server.

11. A digital media player (DMP) for rendering private digital content installed on a content server and protected by authentication information, the DMP lacking authentication capabilities, said DMP is configured to perform the following steps:
    transferring DMP specific information from said DMP to a digital media controller (DMC) capable of generating authentication information;
    receiving authentication information generated by said DMC from said DMP specific information, said authentication information required for gaining access to said private digital content;
    using said authentication information by said DMP to request a first token from the content server;
    using the first token, by the DMP, to get access to the private digital content from an owner of the private digital content;
    transferring the first token and the DMP specific information to the DMC for the generation of second authentication information;
    requesting, by the DMP, a second token from the content server; and
    using the second token to get access to the private digital content from the content server.

12. The DMP as recited in claim 11, wherein said authentication information is dependent on DMC specific information.

13. The DMP as recited in claim 11, wherein said authentication information comprises owner specific information.

14. The DMP as recited in claim 11, wherein said information is generated by the DMC from said DMP specific information using one or more standard Open Authentication calls.

15. The DMP as recited in claim 6, wherein said authentication information is generated by the DMC from said DMP specific information by interacting with a content management server.

* * * * *